United States Patent
Ozawa et al.

(10) Patent No.: US 7,267,490 B2
(45) Date of Patent: Sep. 11, 2007

(54) BEARING APPARATUS FOR A DRIVING WHEEL OF VEHICLE

(75) Inventors: Masahiro Ozawa, Iwata (JP); Eiji Tajima, Iwata (JP); Mitsuru Umekida, Iwata (JP); Hiroyuki Ogura, Iwata (JP)

(73) Assignee: NTN Corporation (JP)

( * ) Notice: Subject to any disclaimer, the term of this patent is extended or adjusted under 35 U.S.C. 154(b) by 200 days.

(21) Appl. No.: 10/327,549

(22) Filed: Dec. 20, 2002

(65) Prior Publication Data

US 2003/0151223 A1 Aug. 14, 2003

(30) Foreign Application Priority Data

| Dec. 21, 2001 | (JP) | ............................. | 2001-389630 |
| Jan. 7, 2002 | (JP) | ............................. | 2002-000546 |
| Jan. 9, 2002 | (JP) | ............................. | 2002-002673 |

(51) Int. Cl.
*F16C 19/08* (2006.01)
(52) U.S. Cl. ...................................... 384/537
(58) Field of Classification Search ................ 384/537, 384/544, 625, 585, 589
See application file for complete search history.

(56) References Cited

FOREIGN PATENT DOCUMENTS

JP 2001-18605 1/2001

*Primary Examiner*—Lenard A. Footland
(74) *Attorney, Agent, or Firm*—Harness, Dickey & Pierce, P.L.C.

(57) ABSTRACT

A bearing apparatus for a driving wheel of vehicle where the weight and size of the apparatus can be reduced and the durability can be improved with adopting plastic deformed connection between essential parts forming the apparatus. The bearing apparatus for a driving wheel of vehicle has a hub wheel, a constant velocity universal joint, and a double row rolling bearing which are assembled as a unit. One of the inner raceway surfaces is formed on the outer circumferential surface of the hub wheel. The other of the inner raceway surfaces is formed on the outer circumferential surface of the outer joint member. The hub wheel and the outer joint member are fitted with each other with one end surface being abutted against the shoulder of the outer joint member. The inner circumferential surface at the fitting portion of the hub wheel is formed with a hardened irregular portion. The hub wheel and the outer joint member are integrally connected via plastic deformation of the outer joint member. The hardened irregular portion bites into the outer circumferential surface at the fitting portion of the outer joint member by radially outwardly expanding the fitting portion of the outer joint member. The outer circumferential surface of the outer joint member is formed with a hardened layer at least at a region including the inner raceway surface and the shaft portion except for the fitting portion of the outer joint member.

17 Claims, 12 Drawing Sheets

(a)　　　　　　　　(b)

(a)

(b)

(a)

(b)

(a)

(b)

BEARING APPARATUS FOR A DRIVING WHEEL OF VEHICLE

CROSS-REFERENCE TO RELATED APPLICATIONS

This application claims priority to Japanese Patent Application Nos. 2001-389630 filed Dec. 21, 2001; 2002-000546 filed Jan. 7, 2002 and 2002-002673 filed Jan. 9, 2002, which applications are herein expressly incorporated by reference.

FIELD OF THE INVENTION

The present invention relates to a bearing apparatus for a driving wheel of vehicle and more particularly to a bearing apparatus for a driving wheel of vehicle in which a hub wheel, a constant velocity universal joint and a double row rolling bearing are assembled as a unit.

BACKGROUND OF THE INVENTION

The driving wheels such as rear wheels of a rear wheel drive vehicle, front wheels of a front wheel drive vehicle and all wheels of a 4WD (4-wheel Drive) vehicle are supported by a suspension system via a bearing apparatus for a driving wheel. In recent years, there has been a tendency to assemble the hub wheel, the constant velocity universal joint and the double row rolling bearing as a unit in order to reduce the weight and the size of the bearing apparatus for a driving wheel.

FIG. 12 is a prior art longitudinal cross-section view of a bearing apparatus for a driving wheel of vehicle where a hub wheel 50, a double row rolling bearing 60 and a constant velocity universal joint 70 are assembled as a unit. The hub wheel 50 is formed integrally with a wheel mounting flange 51 to mount a wheel (not shown) thereon and hub bolts 52 to secure the wheel are equidistantly arranged along the periphery of the flange 51.

The double row rolling bearing 60 comprises an outer member 61, an inner member 62 and double row rolling elements 63 and 63. The outer member 61 has a flange 64 integrally formed therewith to be mounted on a body of vehicle (not shown). The double row outer raceway surfaces 61a and 61a are formed on the inner surface thereof. In this case, the inner member 62 comprises the hub wheel 50 and an outer joint member 71. The inner member 62 is formed with double row inner raceway surfaces 50a and 71a arranged respectively opposite to the outer raceway surfaces 61a and 61a of the outer member 61. The inner raceway surface 50a is formed on the outer circumferential surface of the hub wheel 50 and the other raceway surface 71a is formed on the outer circumferential surface of the outer joint member 71 of the constant velocity universal joint 70. The double row rolling elements 63 and 63 are arranged between the outer raceway surfaces 61a and 61a and the inner raceway surfaces 50a and 71a and rotatably held therein by cages 65 and 65. Seals 66 and 67 are arranged at the ends of the double row rolling bearing in order to prevent leak of grease contained within the bearing and also to prevent incoming of rain water or dusts.

The constant velocity universal joint 70 comprises the outer joint member 71, a joint inner ring, a cage and a torque transmission balls (not shown). The outer joint member 71 has a cup shaped mouth portion 72, a shoulder 74 forming the bottom of the mouth portion 72, a shaft portion 73 axially extending from the shoulder 74, and axially extending curved track grooves 72a formed on the inner surface of the mouth portion 72.

The hub wheel 50 is formed with hardened irregular portion 53 on the inner circumferential surface thereof and has a cylindrical spigot portion 50b at its end. The hub wheel 50 and the outer joint member 71 are mutually connected by fitting the shaft portion 73 of the outer joint member 71 into the hub wheel 50 and then by radially outwardly expanding the fitting portion of the outer joint member 71 to cause plastic deformation of the outer joint member 71. The hardened irregular portion 53 to bite into the outer circumferential surface at the fitting portion of the outer joint member 71 (see Japanese Laid-Open Patent Publication No. 18605/2001).

Such a structure of connection via the plastic deformation can prevent loosening and abrasion of the fitted portion and thus can improve the durability and the driving stability. In addition, since the connection, via the plastic deformation, has both functions of torque transmission and connection of the hub wheel and the outer joint member, it is possible to eliminate securing means such as fastening nuts and to achieve reduction of the weight and size of the apparatus.

However, in such a bearing apparatus for a driving wheel, it suffers from repeating bending moment loads having its node at abutting portion between the hub wheel and the outer joint member when there would be caused an excessive bending moment during turning of the vehicle. In such a case, an excessive stress is caused in the spigot portion of the hub wheel and the shaft portion of the outer joint member, especially at the end of the shaft portion and thus the durability would be diminished. In addition, the repeated bending moment loads would cause deformations of the spigot portion and the shaft portion as well as abnormal abrasion at the abutted portion. Thus, this abrasion causes introduction of abraded debris into the bearing and thus fatigue life reduction of the apparatus.

In such a prior art bearing apparatus for a driving wheel of vehicle, it is possible to reduce the manufacturing cost of the hardened irregular portion and thus the cycle time of the step of radial expansion of the fitting portion of the outer joint member by reducing the length of the connecting portion via plastic deformation. However, it has been found that a desired lifetime cannot be achieved by the apparatus in which the length of the plastic deformed connecting portion is reduced to a length satisfying the allowable transmission torque according to a durability test carried out by the applicant of the present invention by applying the bending moment.

SUMMARY OF THE INVENTION

It is, therefore, an object of the present invention to provide a bearing apparatus for a driving wheel of vehicle which can reduce the weight and the size of the apparatus due to the connection of the hub wheel and the outer joint member via plastic deformation as well as the generation of excessive stress and abrasion and also can improve the durability and thus the lifetime of the apparatus.

It is another object to find out optimum structure of the connecting portion via plastic deformation which can achieve the object above.

According to the present invention, a bearing apparatus for a driving wheel of vehicle comprises a hub wheel formed with a wheel mounting flange at one end. A constant velocity universal joint includes an outer joint member integrally formed with a mouth portion. A shoulder portion is formed in the bottom of the mouth portion and a shaft portion axially extends from the shoulder portion. A double row rolling bearing rotatably supports a vehicle wheel relative to a body of a vehicle. The hub wheel, the constant velocity universal joint and the double row rolling bearing are assembled as a unit. One of the inner raceway surfaces is formed on the outer circumferential surface of the hub wheel. The other of the inner raceway surfaces is formed on the outer circumferential surface of the outer joint member. The hub wheel and the outer joint member are fitted with each other with one end surface being abutted against the shoulder of the outer joint member. The inner circumferential surface at the fitting portion of the hub wheel is formed with a hardened irregular portion. The hub wheel and the outer joint member is integrally connected via plastic deformation of the outer joint member. The hardened irregular portion bites into the outer circumferential surface at the fitting portion of the outer joint member by radially outwardly expanding the fitting portion of the outer joint member. The outer circumferential surface of the outer joint member is formed with a hardened layer at least at a region including the inner raceway surface and the shaft portion except for the fitting portion of the outer joint member.

According to the connection via plastic deformation, it is possible to reduce the weight and the size of the apparatus. Also, it is possible to suppress the generation of excessive stress at the shaft portion and its end and thus improve the durability of the bearing apparatus for a driving wheel.

Preferably, the hub wheel is formed with a cylindrical spigot portion axially extending from the inner raceway surface. A hardened layer is formed on the outer circumferential surface of the hub wheel in a region including the spigot portion and extending from the inner raceway surface to one end surface of the hub wheel. This structure provides the apparatus with a sufficient durability when suffering from an excessive bending moment and prevents ingress of abraded debris into the bearing.

Preferably, a hardened layer is formed in a region of the hub wheel extending from the end surface of the hub wheel to the inner circumferential surface of the end of the spigot portion. This structure reduces abrasion of the spigot portion and the shaft portion of the outer joint member.

Grease is arranged between the abutted surfaces of the end of the hub wheel and the shoulder of the outer joint member. This structure suppresss abrasion of the abutted portion, twist of the shaft portion of the outer joint member, and generation of noise of relative slippage between the outer joint member and the hub wheel, so-called stick-slip noise.

Preferably a grease well is formed on the end surface of the hub wheel. This further suppresses the generation of abrasion and stick-slip noise.

According to the invention, the radial clearance between the spigot portion of the hub wheel and the shaft portion of the outer joint member is set less than 0.5 mm. This receives the repeating bending loads on a cylindrical surface and thus suppresses the deformation of the spigot portion. Accordingly, the durability of the apparatus is remarkably improved.

According to the invention, a bearing apparatus for a driving wheel comprises a hub wheel formed with a wheel mounting flange at one end, an constant velocity universal joint, and a double row rolling. The hub wheel, the constant velocity universal joint and the double row rolling bearing being assembled as a unit. The hub wheel and the outer joint member of the constant velocity universal joint are fitted with each other. The inner circumferential surface at the fitting portion of the hub wheel is formed with a hardened irregular portion. The hub wheel and the outer joint member are integrally connected via plastic deformation of the outer joint member. The hardened irregular portion bites into the outer circumferential surface at the fitting portion of the outer joint member by radially outwardly expanding the fitting portion of the outer joint member. The connected portion, via plastic deformation, is arranged axially outward from the line of action of the double row rolling bearing.

By arranging the connected portion, via plastic deformation, at a place axially outward from the line of action of the double row rolling bearing, it is possible to suppress the bending moment from acting on the plastically deformed connected portion. Accordingly since this connected portion has both functions of torque transmission and of connecting the hub wheel and the outer joint member, it is possible to obtain a desired lifetime of the apparatus.

According to the invention, the hub wheel and the outer joint member are mutually spigot-fitted. The spigot-fitted portion is arranged on the line of action of the double row rolling bearing. Thus it is possible to support the bending moment on the spigot fitting portion, that is, on a cylindrical surface having a sufficient rigidity and thus improve the durability.

According to the invention, the hub wheel is extended outward from the wheel mounting flange to form a wheel piloting portion. The connected portion, via plastic deformation, is arranged at a region from the end face of the wheel piloting portion to the wheel mounting flange. This suppresses the bending moment from acting on the plastically deformed connected portion without spoiling the compactness of the apparatus.

According to the invention, one of the inner raceway surfaces of the double row rolling bearing is formed on the outer circumferential surface of the hub wheel. The other is formed on the outer circumferential surface of the outer joint member. This is so-called a "fourth generation" structure and makes it possible to further reduce the weight and the size of the apparatus.

According to the invention, the hub wheel is formed with a stepped portion of small diameter. A separate inner ring is fitted on the stepped portion. One of the inner raceway surfaces of the double row rolling bearing is formed on the outer circumferential surface of the hub wheel. The other is formed on the outer circumferential surface of the inner ring. This is so-called a "third generation" structure and makes it possible not only to easily control the internal clearance of the bearing but to achieve the standardization due to sub-unitization and thus reduce the manufacturing cost.

According to the invention, a bearing apparatus for a driving wheel comprises a hub wheel formed with a wheel mounting flange at one end, a constant velocity universal joint, and a double row rolling. The hub wheel, the constant velocity universal joint and the double row rolling bearing are assembled as a unit. One of the inner raceway surfaces of the double row rolling bearing is formed on the outer circumferential surface of the hub wheel and the other being formed on the outer circumferential surface of the separate inner ring fitted on the hub wheel. The inner circumferential surface of the end of radially outwardly arranged one of the inner ring and the hub wheel is formed with a hardened irregular portion. The hub wheel and the inner ring are integrally connected, via plastic deformation, of the other one of the inner ring and the hub wheel. The hardened irregular portion bites into the outer circumferential surface at the fitting portion of the other one member by radially outwardly expanding the fitting portion of the other one member. The outer joint member of the constant velocity universal joint is fitted into radially inwardly arranged one of the inner ring and the hub wheel in a torque transmittable manner. The hub wheel or the inner ring and the outer joint member are formed with a spigot fitting portion. The connected portion, via plastic deformation, is arranged axially outward from the line of action of the double row rolling bearing.

This structure is a self-retaining system of the "third generation" structure. Thus, it is possible to control and maintain the internal clearance while making the bearing portion as the sub-unit and also to easily mount the apparatus to the body of vehicle as well as to improve the durability the apparatus while reducing the bending moment acting on the plastically deformed connected portion.

According to the invention, the spigot-fitted portion is arranged on the line of action of the double row rolling bearing. This supports the bending moment on the spigot fitted portion i.e. on the cylindrical surface having sufficient rigidity and thus improves the durability.

According to the invention, a bearing apparatus for a driving wheel comprises a hub wheel, a constant velocity universal joint, and a double row rolling. The hub wheel, the constant velocity universal joint and the double row rolling bearing are assembled as a unit. The hub wheel is formed with one of the inner raceway surfaces of the double row rolling bearing and a stepped portion of small diameter. The hub wheel and the outer joint member of the constant velocity universal joint are fitted with each other. The inner circumferential surface at the fitting portion of the hub wheel is formed with a hardened irregular portion. The hub wheel and the outer joint member are integrally connected via plastic deformation of the outer joint member. The hardened irregular portion bites into the outer circumferential surface at the fitting portion of the outer joint member by radially outwardly expanding the fitting portion of the outer joint member. The irregular portion is formed by crossed grooves comprising one group of plurality of parallel rows of grooves of one direction and the other group of plurality of parallel rows of grooves of the other direction. At least one group of grooves are formed by broaching. The diameter of these grooves is smaller than the inner diameter of the stepped portion of small diameter.

Since the diameter of the grooves to be broached is smaller than the inner diameter of the stepped portion of small diameter, it is possible to prevent the inner surface of the stepped portion from being scratched by the teeth of a broach when it passes therethrough. This prevents reduction of the strength and durability of the stepped portion of the hub wheel considered to be a most weak portion.

Preferably, the irregular portion is formed by discontinuous annular grooves and axially extending grooves crossing orthogonally with the annular grooves. This efficiently transmits the torque from the outer joint member to the hub wheel with the plurality rows of axially extending parallel grooves and also axially secures both the member without a play with the plurality rows of parallel annular grooves.

According to the invention, the irregular portion is formed by helical grooves and axially extending grooves crossing with the helical grooves. The helical grooves can be easily formed by turning and has the same functions as those of annular grooves.

The irregular portion may be formed by a first group of inclined helical grooves and a second group of helical grooves axial symmetric with the first group of helical grooves. In these inclined helical grooves, it is possible to form one by turning and the other by helical broaching or to form both of them with a crisscross pattern knurl by helical broaching and thus has high productivity.

According to the invention, the other of the inner raceway surfaces of the double row rolling bearing is formed on the outer circumferential surface of the outer joint member. This is a so-called "fourth generation" structure and can minimize the number of fitted portions and parts and thus minimizes cumulative errors such as misalignment of the fitted portions which would cause adverse effects on the lateral run out of the hub flange. Accordingly, it is possible to further reduce the weight and the size of the apparatus and to improve the durability and the driving stability.

Preferable, a hardened layer is formed in a region extending from the inner raceway surface to the end surface of the stepped portion of small diameter as well as the inner circumferential surface of the end thereof. This suppresses abrasion of the stepped portion of small diameter and the shaft portion of the outer joint member fitted with each other via a cylindrical surface.

According to the invention, the radial clearance between the stepped portion of small diameter of the hub wheel and the shaft portion of the outer joint member is set less than 0.5 mm. Although the radial clearance in the spigot fitting portion is preferably as small as possible so as to suppress the deformation of the hub wheel, it is set at a range of 0.50~0.10 mm, preferably 0.35~0.05 mm. This supports the repeating loads on the cylindrical surface as well as suppresses the stepped portion of small diameter against the repeating loads and thus remarkably improves the durability of the apparatus.

BRIEF DESCRIPTION OF THE DRAWINGS

Additional advantages and features of the present invention will become apparent from the subsequent description and the appended claims, taken in conjunction with the accompanying drawings, wherein:

DESCRIPTION OF THE PREFERRED EMBODIMENTS

Figure 1:
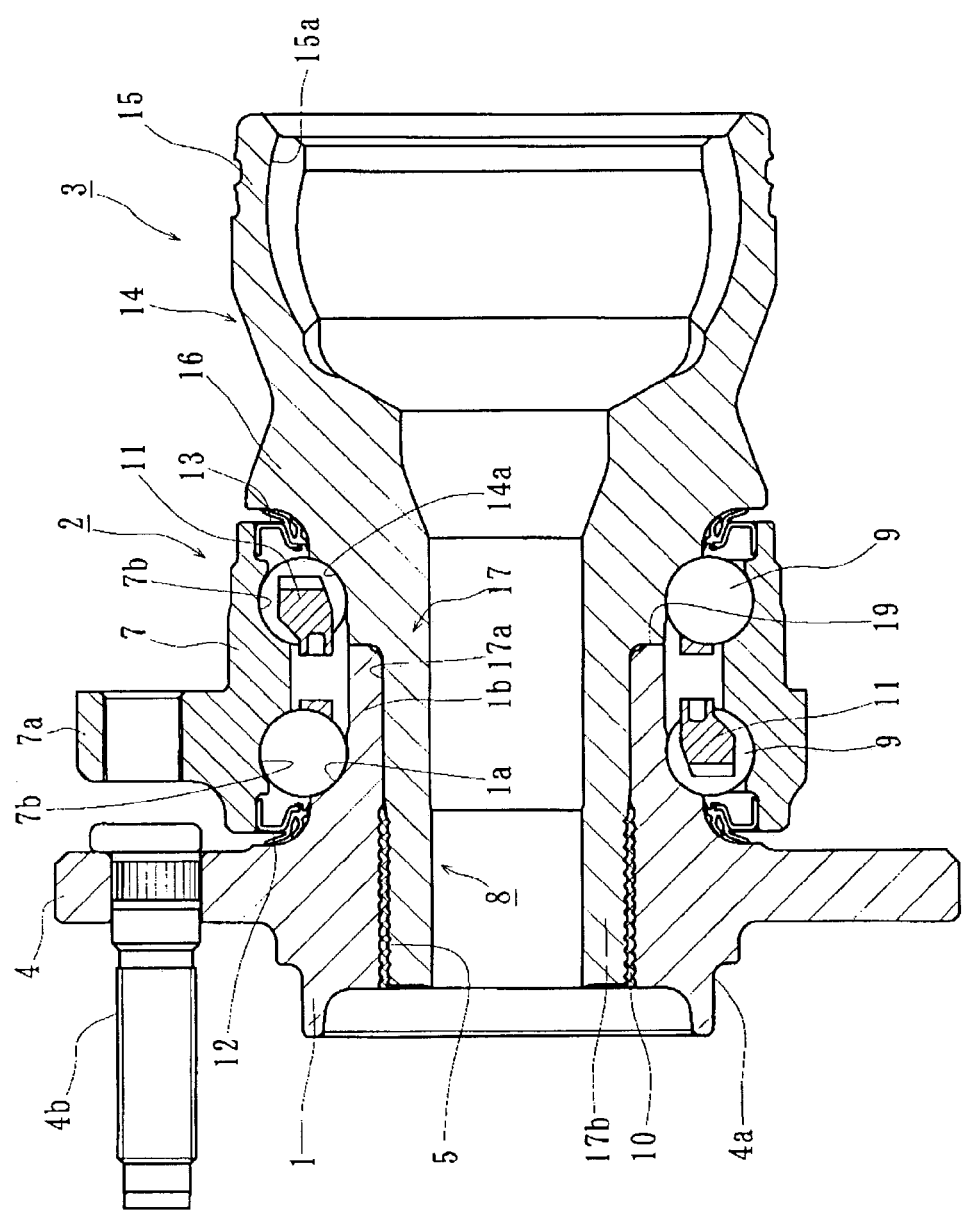
FIG. 1 is a longitudinal section view showing a first embodiment of the bearing apparatus for a driving wheel of the present invention.

FIG. 1 shows a first embodiment of a bearing apparatus for a driving wheel of vehicle of the present invention. The apparatus comprises a hub wheel 1, a double row rolling bearing 2 and a constant velocity universal joint 3 which are assembled as a unit. In the description below, a term "outboard side" of the apparatus denotes a side which is positioned outside of the vehicle body and a term "inboard side" of the apparatus denotes a side which is positioned inside of the body when the apparatus is mounted on the vehicle body.

The hub wheel 1 is formed integrally with a wheel mounting flange 4 at the outboard side of the hub wheel 1 on which a wheel (not shown) is mounted. Hub bolts 4b are equidistantly arranged on the flange 4 along its periphery. A wheel piloting portion 4a extends from the wheel mounting flange 4 to the outboard side. The inner circumferential surface of the hub wheel 1 is formed with a irregular portion 5 which are heat treated as having a hardened layer 10 (shown by a cross-hatching in FIG. 1) having a surface hardness of HRC 54~64. It is preferable to use as heat treatment a high frequency induction heating which can easily carry out a local heating and a setting of the depth of a hardened layer.

Figure 2:
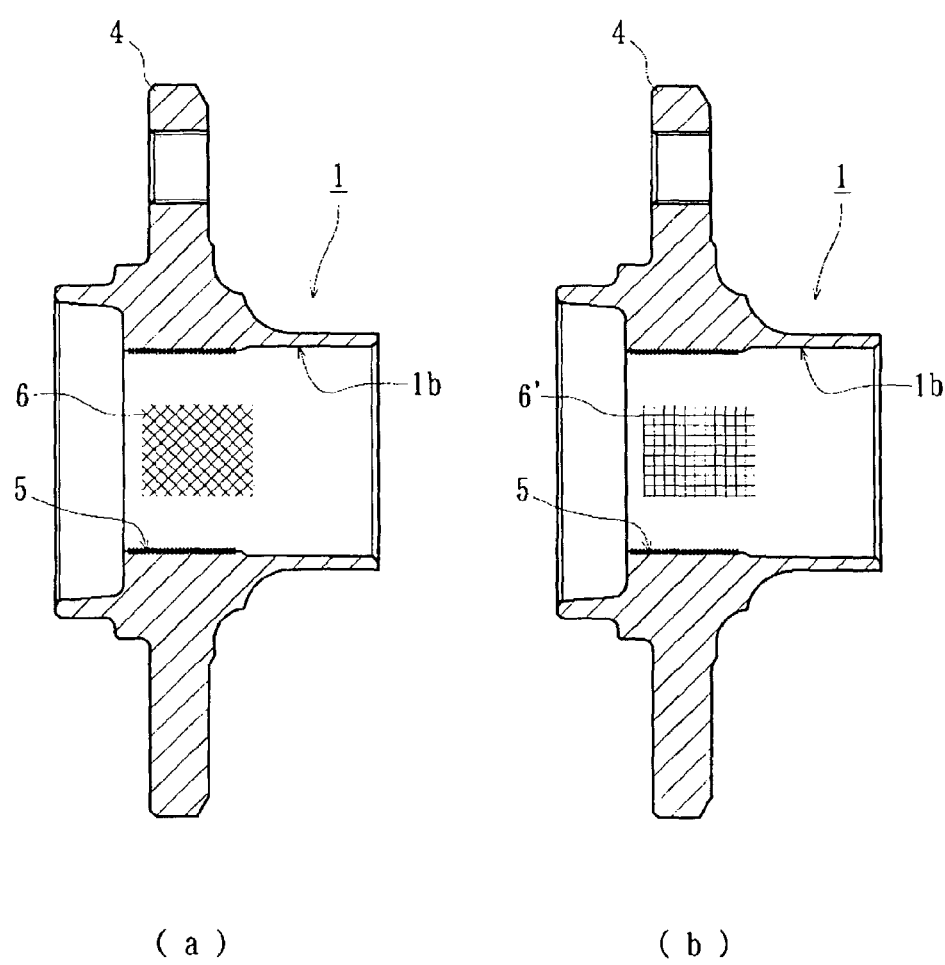
FIG. 2 (a) is a longitudinal section view showing a crisscross pattern knurl formed by mutually inclined helical grooves as an irregular portion, and FIG. 2 (b) is a longitudinal section view showing a crisscross pattern knurl formed by mutually crossed axial grooves and discontinuous annular grooves as an irregular portion.

FIG. 2 shows example of the irregular portion 5 in which FIG. 2 (a) shows an example of the irregular portion 5 comprising mutually inclined helical grooves 6. FIG. 2 (b) shows another example of the irregular portion 5 of crossed grooves 6' comprising axial grooves and discontinuous annular grooves. It is preferable to form the irregular portion by pointed projections.

The double row rolling bearing 2 comprises an outer member 7, inner member 8 and a double row rolling elements 9 and 9. The outer member 7 is integrally formed on its outer circumferential surface with a body mounting flange 7a and on its inner circumferential surface with double row outer raceway surfaces 7b and 7b. On the other hand, the inner member 8 comprises the hub wheel 1 and an outer joint member 14 hereinafter described. Inner raceway surfaces 1a and 14a that oppose the outer raceway surfaces 7b and 7b, are arranged on the outer circumferential surfaces of the hub wheel 1 and the outer joint member 14, respectively. The double row rolling elements 9 and 9 are contained between the outer raceway surfaces 7b and 7b and the inner raceway surfaces 1a and 14a and are freely rotatably held by cages 11 and 11. Seals 12 and 13 are arranged at the ends of the bearing 2 to prevent leakage of grease contained within the bearing 2 as well as ingress of rain water or dusts. The illustrated ball rolling elements 9 and 9 may be replaced for example by tapered rolling elements.

Figure 3:
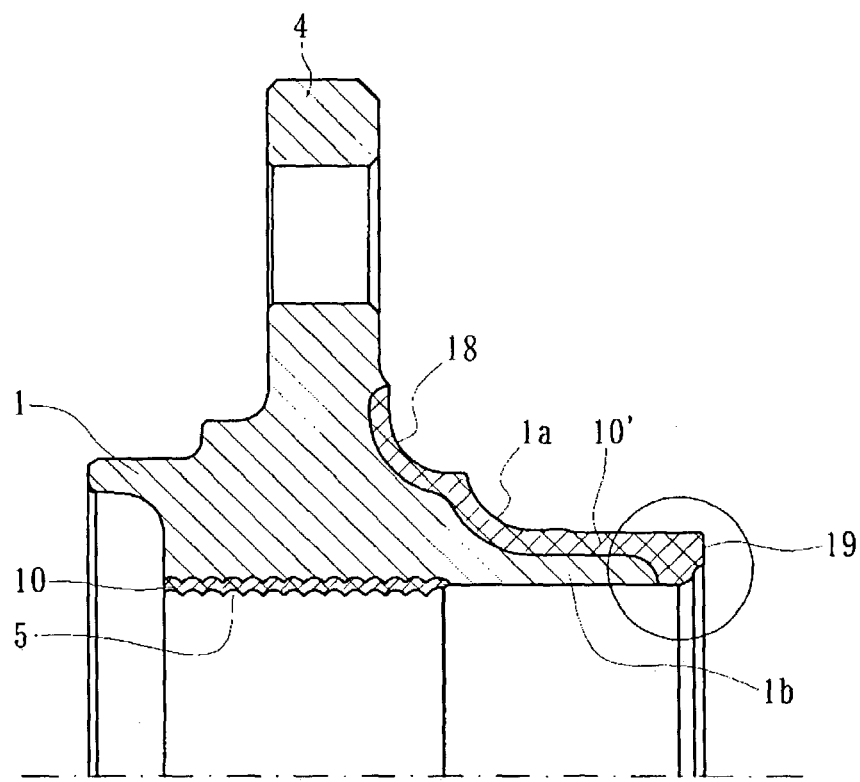
FIG. 3 (a) is a longitudinal section view showing a hub wheel of the bearing apparatus for a driving wheel of the present invention, and FIG. 3 (b) is a partially enlarged section view of FIG. 3 (a)
Figure 3:
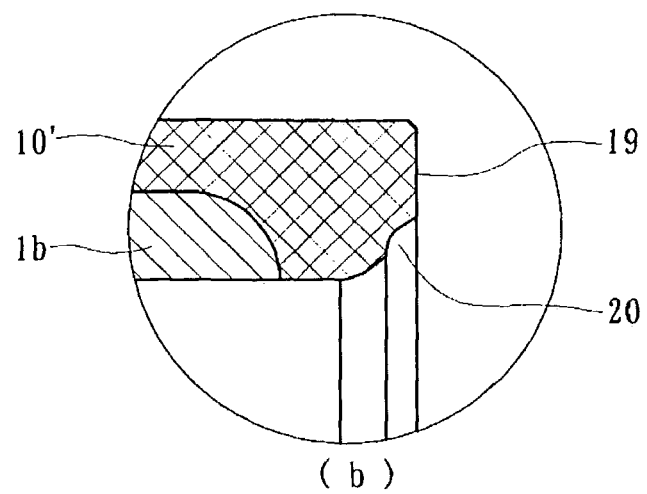

As shown in FIG. 3 (a), a hardened layer 10'(shown by a cross-hatching in FIG. 3 (a)) is formed on the surface of the hub wheel 1 at a seal land portion 18 on which the seal 12 slidably contacts, the inner raceway surface 1a, a surface of spigot portion 1b against which a shoulder 16 of the outer joint member 14 abuts, and an end surface 19 of the spigot portion 1b.

As shown in FIG. 3 (b), the hardened layer 10'extends to the end surface 19 and partially to the inner circumferential surface of the end of the spigot portion 1b. This arrangement suppresses abrasion of the spigot portion 1b and a stepped portion of small diameter 17a, which are fitted with each other via a cylindrical surface. A grease well 20 is formed on the inner surface of the end surface 19 of the spigot portion 1b. The grease well 20 may be arranged on the inner circumferential surface of the spigot 1b.

The constant velocity universal joint comprises a joint inner ring, a cage and torque transmitting balls other than the outer joint member 14. The outer joint member 14 has a cup-shaped mouth portion 15, a shoulder 16 forming the bottom of the mouth portion 15, a shaft portion 17 axially extending from the shoulder 16, and an axially extending curved track groove 15a formed on the inner surface of the mouth portion.

The outer joint member 14 is formed with the inner raceway surface 14a around the outer circumferential surface of the shoulder 16. The shaft portion 17 of the outer joint member 14 has a stepped portion of small diameter 17a and a fitting portion 17b. The fitting portion 17b is fitted into the hub wheel 1 with the end surface 19 of the spigot portion 1b of the hub wheel 1 abutting against the shoulder 16 of the outer joint member 14. The hub wheel 1 and the outer joint member 14 are integrally connected via plastic deformation of the fitting portion 17b of the outer joint member 14. The hardened irregular portion 5 of the hub wheel 1 bites into the outer circumferential surface at the fitting portion of the outer joint member 14 by radially outwardly expanding the fitting portion of the outer joint member 14. Since the fitted portion via plastic deformation, has both a torque transmitting function and a joining function of the hub wheel 1 and the outer joint member 14, any provision of torque transmitting means such as a conventional serration means on the hub wheel 1 and the outer joint member 14 as well as securing means such as nuts is not required and accordingly it is possible to realize further reduction of the weight and size of the apparatus.

Figure 4:
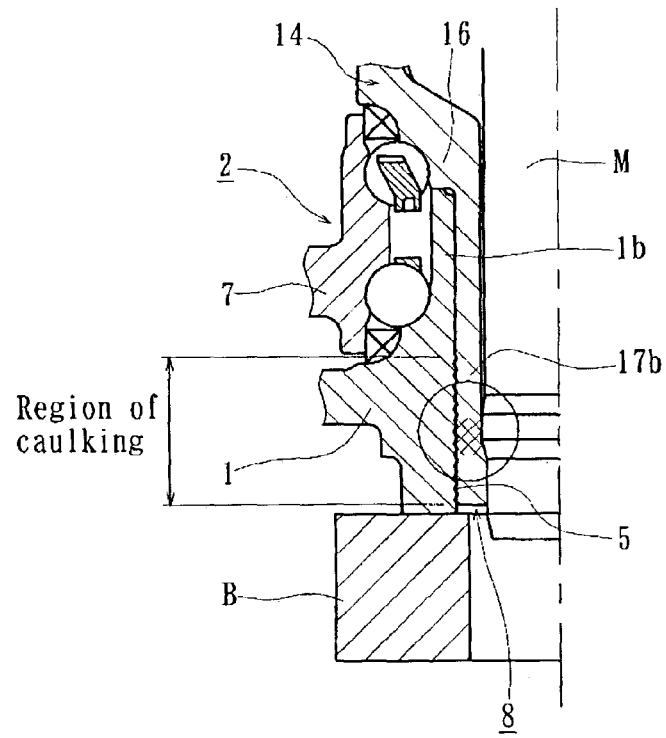
FIG. 4 (a) is an explanatory cross-section view showing a method for connection via plastic deformation in the bearing apparatus for a driving wheel of the present invention, and FIG. 4 (b) is a partially enlarged section view of FIG. 4 (a)
Figure 4:
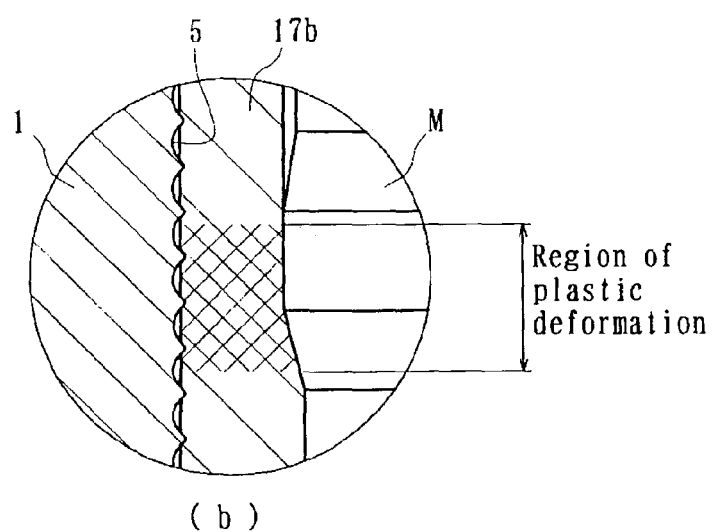

The caulking can be carried out, as shown in FIGS. 4 (a) and (b), firstly by placing the inner member 8 on a pedestal "B" and then by inserting a mandrel "M" into the outer joint member 14 from the inboard side to the outboard side. Since the spigot portion 1b of the hub wheel 1 is axially compressed between the shoulder 16 of the outer joint member 14 and the pedestal "B" and the fitting portion (crosshatched portion) 17b is radially outwardly expanded, the residual compressive stress is still kept after the plastic deformed connection. Accordingly no axial clearance is caused at the abutted portion between the spigot portion 1b and shoulder 16 and thus the internal clearance of the double row rolling bearing 2 can be maintained at an initially set negative clearance.

Figure 5:
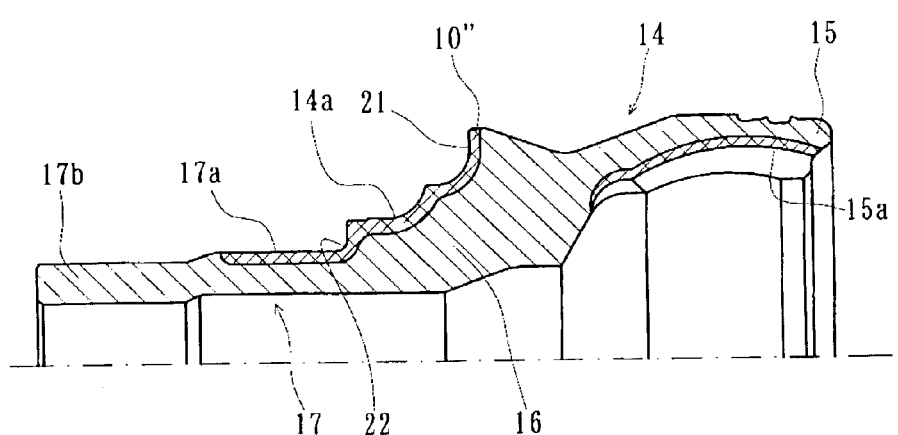
FIG. 5 is a longitudinal section view of the outer joint member of the bearing apparatus for a driving wheel of the present invention.

As shown in FIG. 5, the outer joint member 14 is formed with a hardened layer 10" at the track groove 15a formed on the inner surface of the mouth portion 15, and a region from the seal land portion 21 on which the seal slidably contacts to the stepped portion of small diameter 17a of the shaft portion 17 through the inner raceway surface 14a. It is preferable to carry out the heat treatment by the high frequency induction heating. It is also preferable to keep the fitting portion 17b as no-quenched portion having surface hardness less than HRC 24 and to set the surface hardness of the irregular portion 5 of the hub wheel 1 at about HRC 54~64 to hold a difference in the hardness between the irregular portion 5 and the fitting portion 17b larger than HRC 30. This enable the irregular portion 5 to easily bite into the fitting portion 17b without causing deformation of the irregular portion 5 to tightly combine them via the plastic deformation.

The abutted portion of the hub wheel 1 and the outer joint member 14 functions as a node and suffers from repeating bending moment when excessive bending moment arises during turning of a vehicle. During which, excessive stress tends to be caused at the spigot portion 1b of the hub wheel 1 and the shaft portion 17 of the outer joint member 14, especially at a corner 22 of the stepped portion of small diameter 17a and thus the durability would be reduced. In addition, abnormal abrasion would be caused in the abutted portion of the spigot portion 1b and the stepped portion of small diameter 17a due to their deformation or abraded debris would enter into the bearing. However, the provision of the hardened layer 10″ on the surface from the inner raceway surface 14a to the corner 22 increases the strength and the durability against the torsional moment and also suppresses generation of abrasion even though relative slippage is caused by the repeating bending moment at the abutted portion between the spigot portion 1b and the shoulder 16.

Although not illustrated, an end cap is usually arranged at an end of the outer joint member 14 in order to prevent leakage of grease contained within the mouth portion 15 and ingress of dusts from the outside.

The spigot portion 1b of the hub wheel 1 and the stepped portion of small diameter 17a are fitted with each other via a cylindrical surface and thus sufficient rigidity can be obtained against the repeating bending load. Although it is a usual manner to provide a radial clearance of 0.5~1.0 mm at the spigot portion of this kind to be fitted to form a guide surface during assembly, the radial clearance is set as small as possible according to the embodiment of the present invention at the sacrifice of easiness of assembly. It has been found that setting of the radial clearance in the fitting portion less than 0.5 mm is effective in improveing the durability from a durability test carried out by the applicant.

Figure 6:
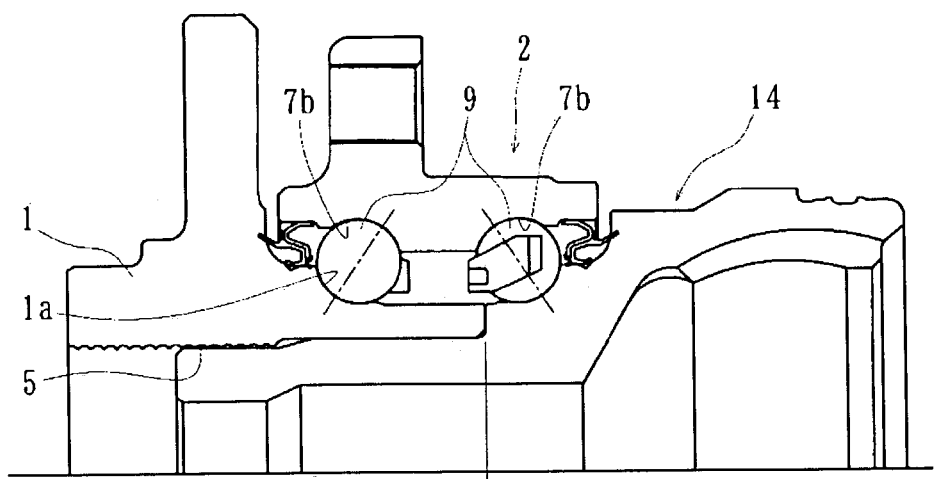
FIG. 6 (a) is an explanatory view showing the stress generated in a bearing apparatus of the prior art when the bending moment is applied thereto, and FIG. 6 (b) is an explanatory view showing the stress generated in a bearing apparatus of a second embodiment of the present invention when the bending moment is applied thereto.
Figure 6:
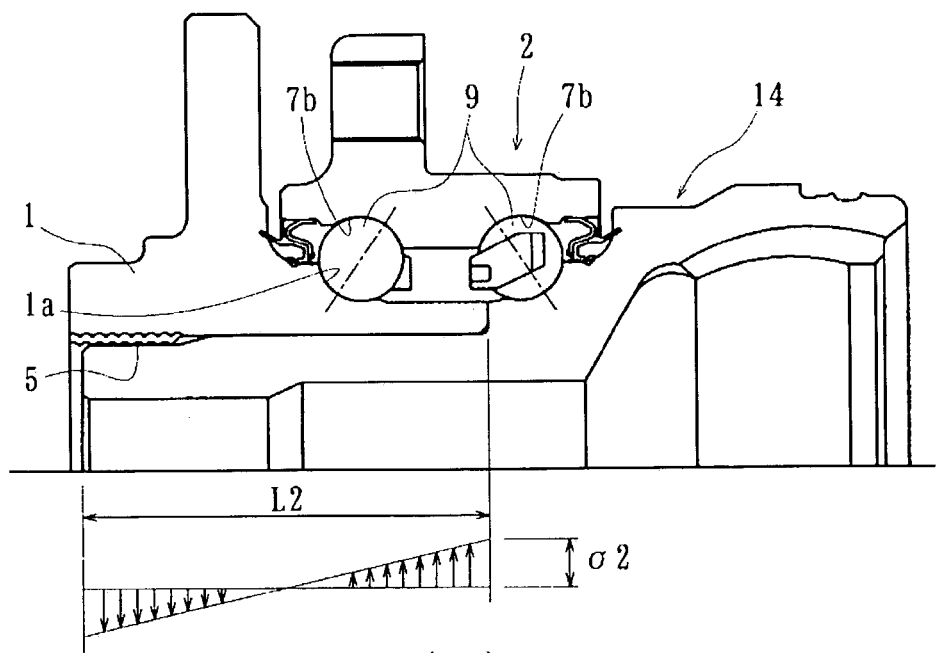

FIGS. 6 (a) and (b) are explanatory views each showing a stress caused when the bearing apparatus for a driving wheel suffers from bending moment. FIG. 6 (a) shows a case of an apparatus of the prior art. FIG. 6 (b) shows a case of the apparatus of the second embodiment of the present invention.

In the bearing apparatus for a driving wheel in which the hub wheel 1 and the outer joint member 14 are integrated via plastic deformation. It is possible to reduce manufacturing cost by reducing the length of the connection via plastic deformation due to the possibility of reduction of working cost of the irregular portion 5 as well as the cycle time of the radially outward expanding step. The applicant of the present invention has carried out an analysis of strength of several positions to find out an optimum relation between a length of the plastic deformation and its position, and a durability test when loaded by the bending moment by using various kinds of samples in which the length and position of the connection via plastic deformation are changed. In the apparatus of the prior art of FIG. 6 (a) in which the length of the plastic deformed connection is reduced to a length satisfying an allowable torque transmission, slippage was caused after a lapse of about 10 hours. On the contrary, in the apparatus of the present invention in which the plastic deformed connection is positioned axially outward from the line of action of the double row rolling bearing 2, no failure such as slippage in the plastic deformed connection was caused after a lapse of more than 100 hours. All peelings were due to expiration of the life time in rolling fatigue of the bearing portion. As comparatively shown in FIGS. 6 (a) and (b), in the apparatus of the present invention shown in FIG. 6 (b) the area (L2) of pressure receiving surface for supporting the bending moment is larger than that (L1) in the apparatus of the prior art shown in FIG. 6 (a). Accordingly, the stress ($\sigma$2) caused in that area of the apparatus of the present invention is smaller than that ($\sigma$1) of the prior art. Thus the durability of the bearing apparatus of the present invention can be extended over that of the prior art.

The reason why the durability of the bearing apparatus of the present invention is extended over that of the prior art is that the arrangement of the plastic deformed connection at an outboard side from the line of action of the bearing 2 suppresses the action of the bending moment to the plastic deformed connection. The arrangement of the spigot fitting portion on the line of action increases its rigidity because of the bending moment being supported on the cylindrical surface of the spigot fitting portion. Although smaller radial clearance in the spigot fitting portion is advantageous to suppress the deformation of the hub wheel 1, it is set at 0.50~−0.10 mm, preferably at 0.35~−0.05 mm in view of easiness of fitting. The term "line of action" denotes a line connecting the center of the rolling element 9 and its contacting point with its inner raceway surface 1a.

Figure 7:
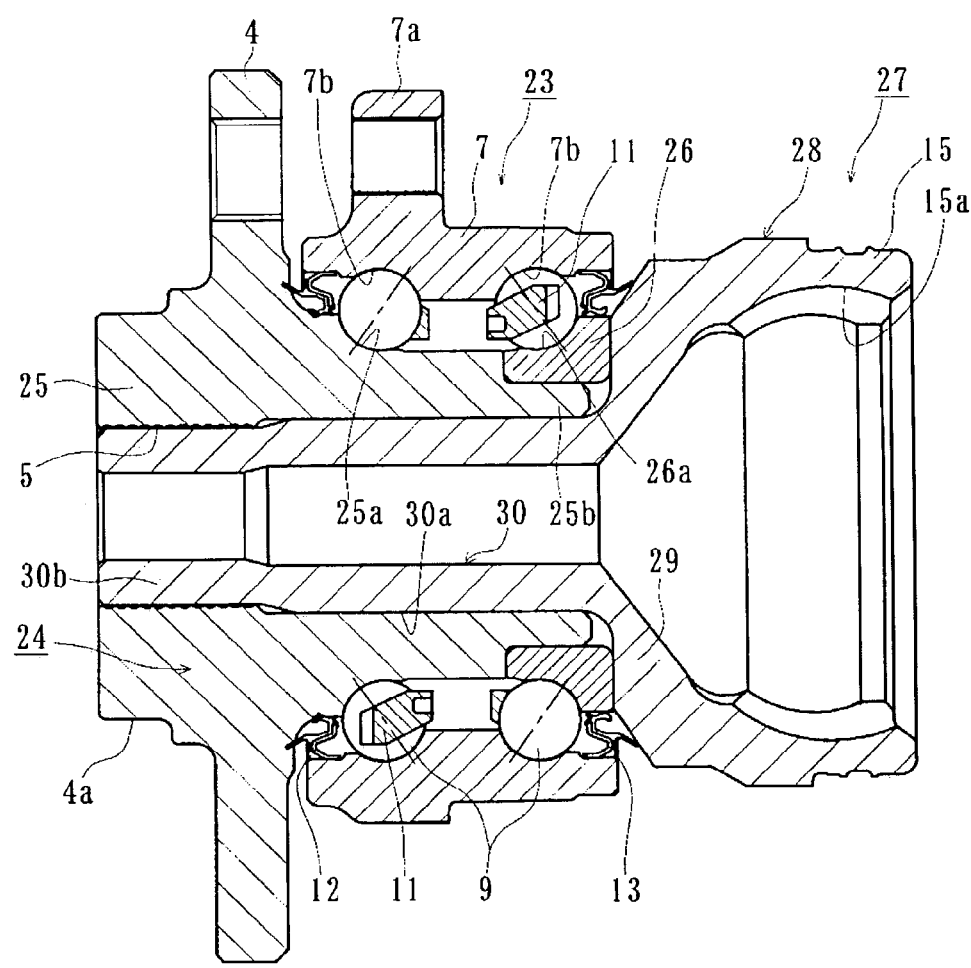
FIG. 7 is a longitudinal section view showing a third embodiment of the bearing apparatus for the driving wheel of the present invention.

FIG. 7 is a longitudinal view showing a third embodiment of the bearing apparatus for a driving wheel of the present invention. This embodiment differs from the aforementioned embodiments only in a structure of the bearing portion and thus same reference numerals are used for designating the same parts.

The bearing portion in the third embodiment has a structure of a so-called "third generation" and a double row rolling bearing 23 comprises the outer member 7, an inner member 24, and double row rolling elements 9 and 9 arranged between the outer and inner members 7 and 24. In this embodiment the inner member 24 denotes a hub wheel 25 and an inner ring 26 which are hereinafter described.

The hub wheel 25 is formed integrally with the wheel mounting flange 4 at the outboard side of the hub wheel 25. A wheel (not shown) is mounted and the wheel piloting portion 4a extends from the wheel mounting flange 4 to the outboard side. The hub wheel 25 is formed with a stepped portion of small diameter 25a extending from an inner raceway surface 25a to the inboard side. A separate inner ring 26 is fitted on the stepped portion 25b. Another inner raceway surface 26a is formed on the outer circumferential surface of the inner ring 26. The hardened irregular portion 5 is formed on the inner circumferential surface of the hub wheel 25 from the end surface of the pilot portion 4a to a position corresponding to the wheel mounting flange 4.

An outer joint member 28 of a constant velocity universal joint 27 has the mouth portion 15, a shoulder 29 forming the bottom of the mouth portion 15, and a shaft portion 30 axially extending from the shoulder 29. The shaft portion 30 has a stepped portion of small diameter 30a and a fitting portion 30b. The stepped portion 30a of the spigot fitted into the stepped portion 25b of the hub wheel 25.

The hub wheel 25 and the outer joint member 28 are integrally connected via plastic deformation of the outer joint member 28 by fitting the shaft portion 30 into the hub wheel 25 and then by radially outwardly expanding the fitting portion of the outer joint member 28. The hardened irregular portion 5 bites into the outer circumferential surface of the outer joint member 28.

By arranging the bearing portion as the "third generation" structure, it is possible to easily control the internal clearance of the bearing and to standardize the bearing portion by subunitize it, so as to reduce cost. Also in this third embodiment, since the plastic deformed connection is arranged at the outboard side from the line of action of the bearing 23 and the spigot fitting portion is arranged on the line of action, it is possible to suppress the action of the bending moment to the plastic deformed connection and to support the bending moment on the cylindrical surface of the spigot fitting portion.

Figure 8:
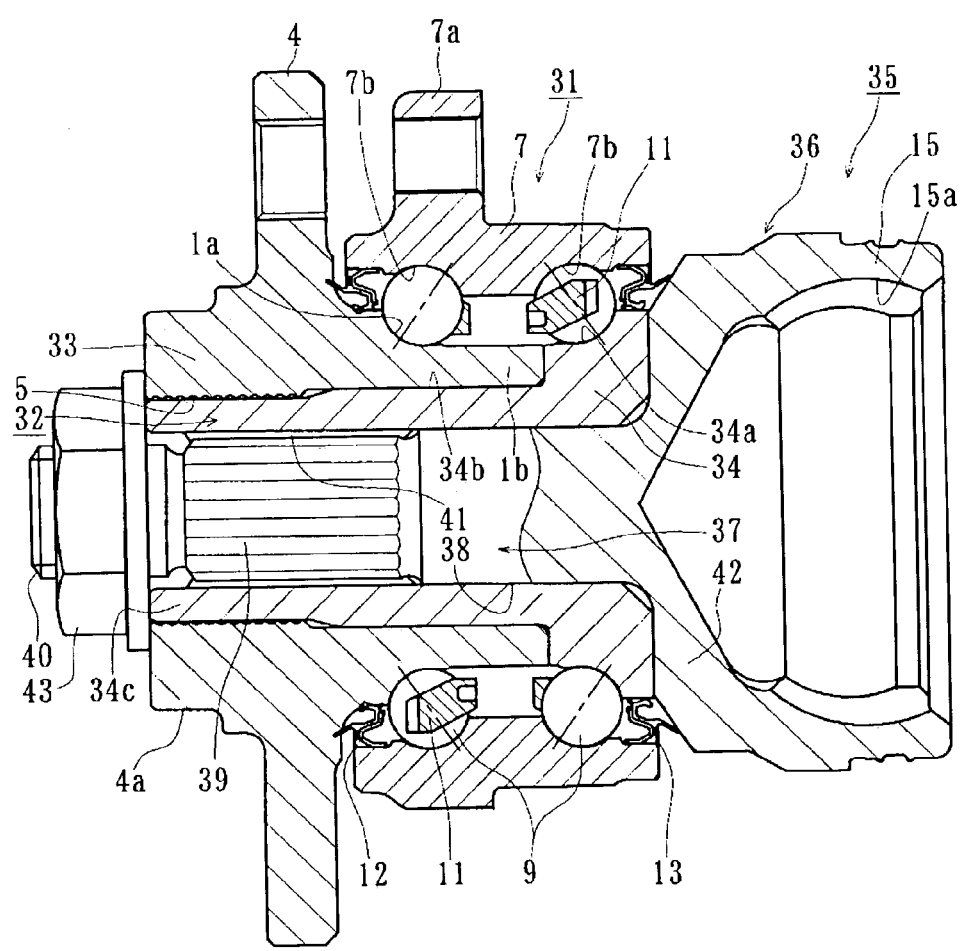
FIG. 8 is a longitudinal section view showing a fourth embodiment of the bearing apparatus for the driving wheel of the present invention.

FIG. 8 is a longitudinal view showing a fourth embodiment of the bearing apparatus for a driving wheel of the present invention. This embodiment differs from the aforementioned embodiments in a structure of the bearing portion as well as connecting member of this bearing portion and the outer joint member and thus the same reference numerals are used for designating the same parts.

This bearing portion is a modification of the "third generation" structure and a double row rolling bearing 31 comprises the outer member 7, an inner member 32. The double row rolling elements 9 and 9 arranged between the outer and inner members 7 and 32. In this embodiment, the inner member 32 denotes a hub wheel 33 and an inner ring 34.

The hub wheel 33 is formed integrally with the wheel mounting flange 4 at the periphery thereof on which a wheel (not shown) is mounted. The wheel piloting portion 4*a* extends from the wheel mounting flange 4 to the outboard side. The hub wheel 33 is formed with the spigot portion 1*b* at the inboard side from the inner raceway surface 1*a*. A separate inner ring 34 is fitted in the spigot portion 1*b* in a manner of abutment with each other. Another inner raceway surface 34*a* is formed on the outer circumferential surface of the inner ring 34. The hardened irregular portion 5 is formed on the inner circumferential surface of the hub wheel 33 from the end surface of the pilot portion 4*a* to a position corresponding to the wheel mounting flange 4.

The inner ring 34 is cylindrical and has a stepped portion of small diameter 34 axially extending from the inner raceway surface 34*a* as well as a fitting portion 34*c*. The hub wheel 33 and the inner ring 34 are integrally connected via plastic deformation of the inner ring 34 by fitting the stepped portion 34*b* into the spigot portion 1*b* of the hub wheel 33 and then by radially outwardly expanding the fitting portion 34*c* of the inner ring 34. The hardened irregular portion 5 bites into the outer circumferential surface of the inner ring 34.

An outer joint member 36 of a constant velocity universal joint 35 has a solid shaft portion 37 which is formed with a step portion 38 of small diameter, a serration (or a spline) 39, and screw thread 40 at its end. A serration (or a spline) 41 formed on an inner surface of the inner ring 34 mates the serration 39 formed on the shaft 37 of the outer joint member 36 in a torque transmissible manner. In addition, the inner member 32 and the outer joint member 36 are demountably combined with each other by a nut 43 screwed into the thread 40. The inner ring 34 and a stepped portion 38 of the outer joint member 36 are spigot fitted. The shoulder 42 and the end surface of the inner ring 34 are abutted with each other.

The fourth embodiment has a self-retaining structure. That is, the internal clearance within the bearing portion can be maintained due to the internal clearance is integrally combined via plastic connection in a controlled manner. In addition, the durability can be improved due to suppression of loading of the bending moment on the plastic deformed connection. The workability in assembling the apparatus to the vehicle body can be improved due to the torque transmittable and demountable connection of the inner member 32 and the outer joint member 36 and thus this is very convenient conjointly with a merit of serviceability as a sub-unit.

Figure 9:
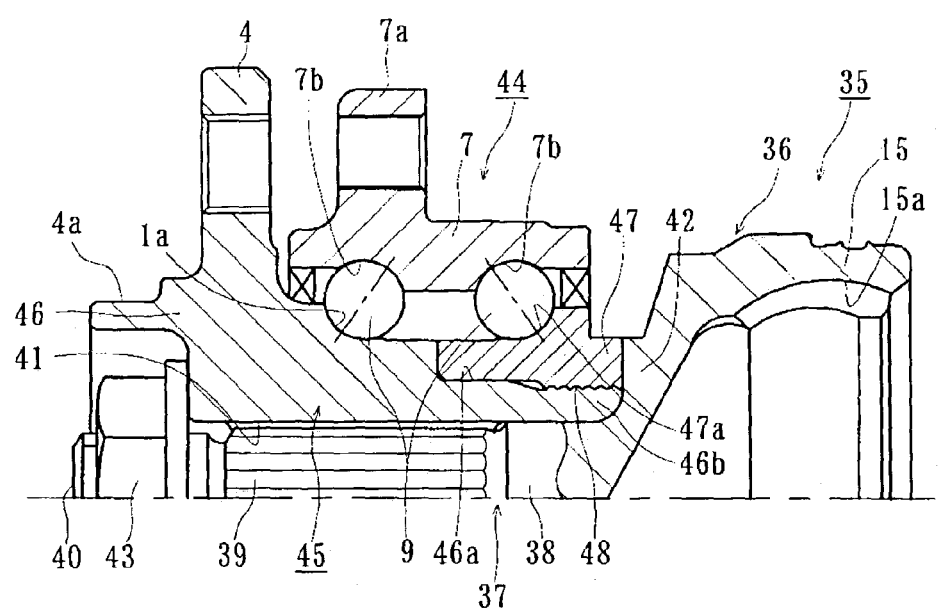
FIG. 9 is a longitudinal section view showing a fifth embodiment of the bearing apparatus for the driving wheel of the present invention.

FIG. 9 is a longitudinal view showing a fifth embodiment of the bearing apparatus for a driving wheel of the present invention. This embodiment differs from the fourth embodiment only in the structure of the bearing portion and thus the same reference numerals are used for designating the same parts.

This bearing portion is also the "third generation" of self-retaining system and a double row rolling bearing 44 comprises the outer member 7, an inner member 45, and the double row rolling elements 9 and 9 arranged between the outer and inner members 7 and 45. In this embodiment, the inner member 45 denotes a hub wheel 46 and an inner ring 47.

The hub wheel 46 has a fitting portion 46*b* extending from a stepped portion of small diameter 46*a* on which a separate ring 47 is fitted. The hub wheel 46 and the inner ring 47 are integrally connected via plastic deformation of the fitting portion 46*b* by radially outwardly expanding the fitting portion 46*b* of the hub wheel 46. An irregular portion 48 is formed on the inner surface of its end of the inner ring 47 to bite into the outer circumferential surface of the fitting portion 46*b*.

A serration (or a spline) 41 formed on an inner surface of the hub wheel 46 mates the serration 39 formed on the shaft 37 of the outer joint member 36 in a torque transmissible manner. The fitting portion 46*b* of the hub wheel 46 and a stepped portion 38 of the outer joint member 36 are spigot fitted. The shoulder 42 of the outer joint member 36 and the end surface of the inner ring 47 are abutted with each other. In addition, the hub wheel 46 and the outer joint member 36 are demountably combined with each other by a nut 43 screwed on the thread 40 formed on the tip of the shaft portion 37.

Also in this fifth embodiment, since the plastic deformed connection is arranged at the outboard side from the line of action of the bearing 44 and the spigot fitting portion is arranged on the line of the action, it is possible to suppress the action of the bending moment to the plastic deformed connection and to support the bending moment on the cylindrical surface of the spigot fitting portion.

Figure 10:
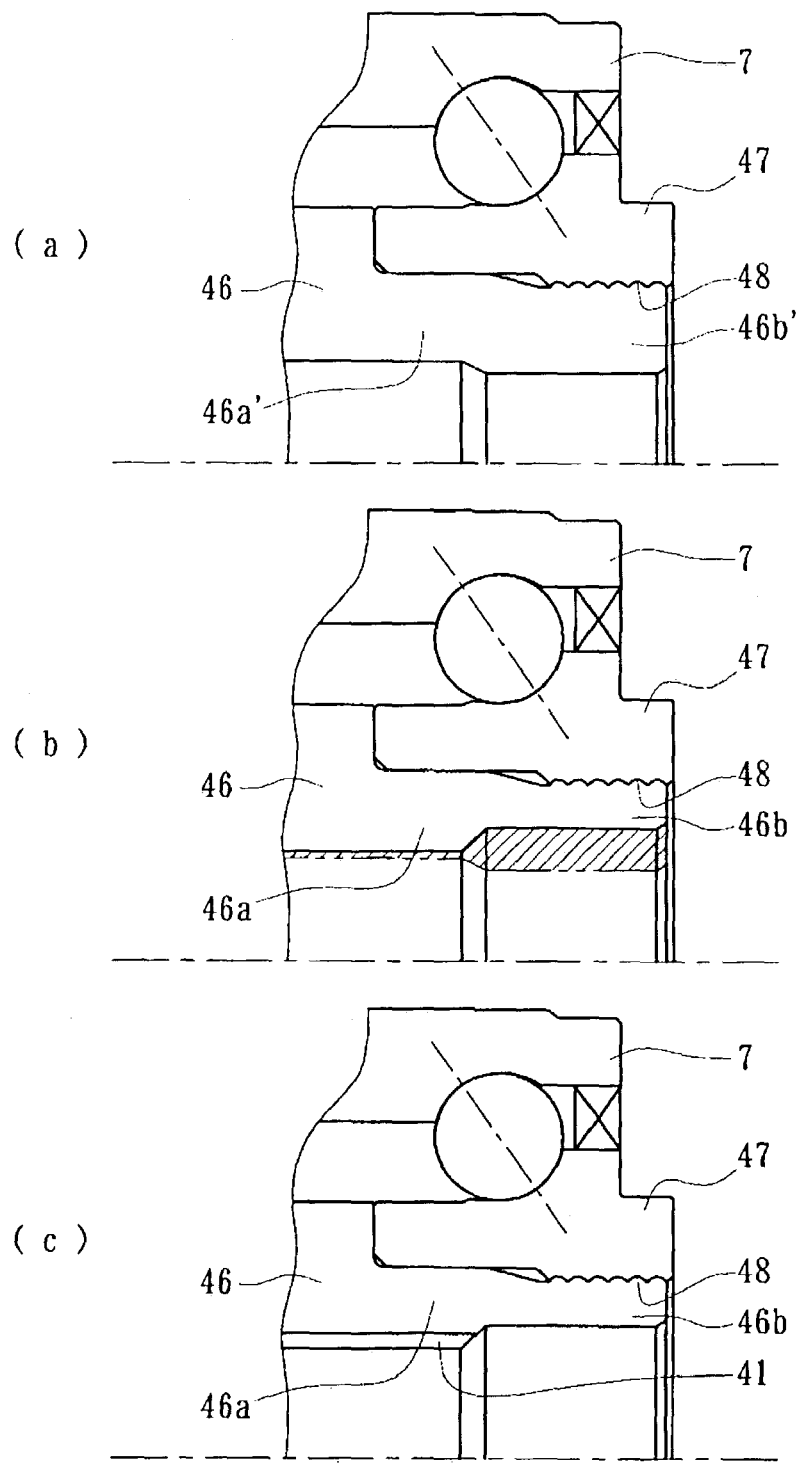
FIGS. 10 (a) through (c) are explanatory views showing a method for manufacturing the embodiment of FIG. 9.

A method for manufacturing the fifth embodiment will be described with reference to FIG. 10. Firstly, formed portions 46*a*" and 46*b*" correspond to the stepped portion of small diameter 46*a* and the fitting portion 46*b* of the hub wheel 46 (as shown in FIG. 10 (*a*)). The portion 46*b*" is formed as having a smaller diameter than portion 46*a*" to provide a margin for radial expansion and the fitting portion 46*b*" is radially outwardly expanded to make an irregular portion 48 of the inner ring 47 to bite into the fitting portion 46*b*". Then the hatched portion shown in FIG. 10 (*b*) is removed by turning, to finish to a predetermined prepared aperture and an inner diameter of the fitting portion 46*b*. Finally, The serration 41 is finish formed by broaching as shown in FIG. 10 (*c*).

Figure 11:
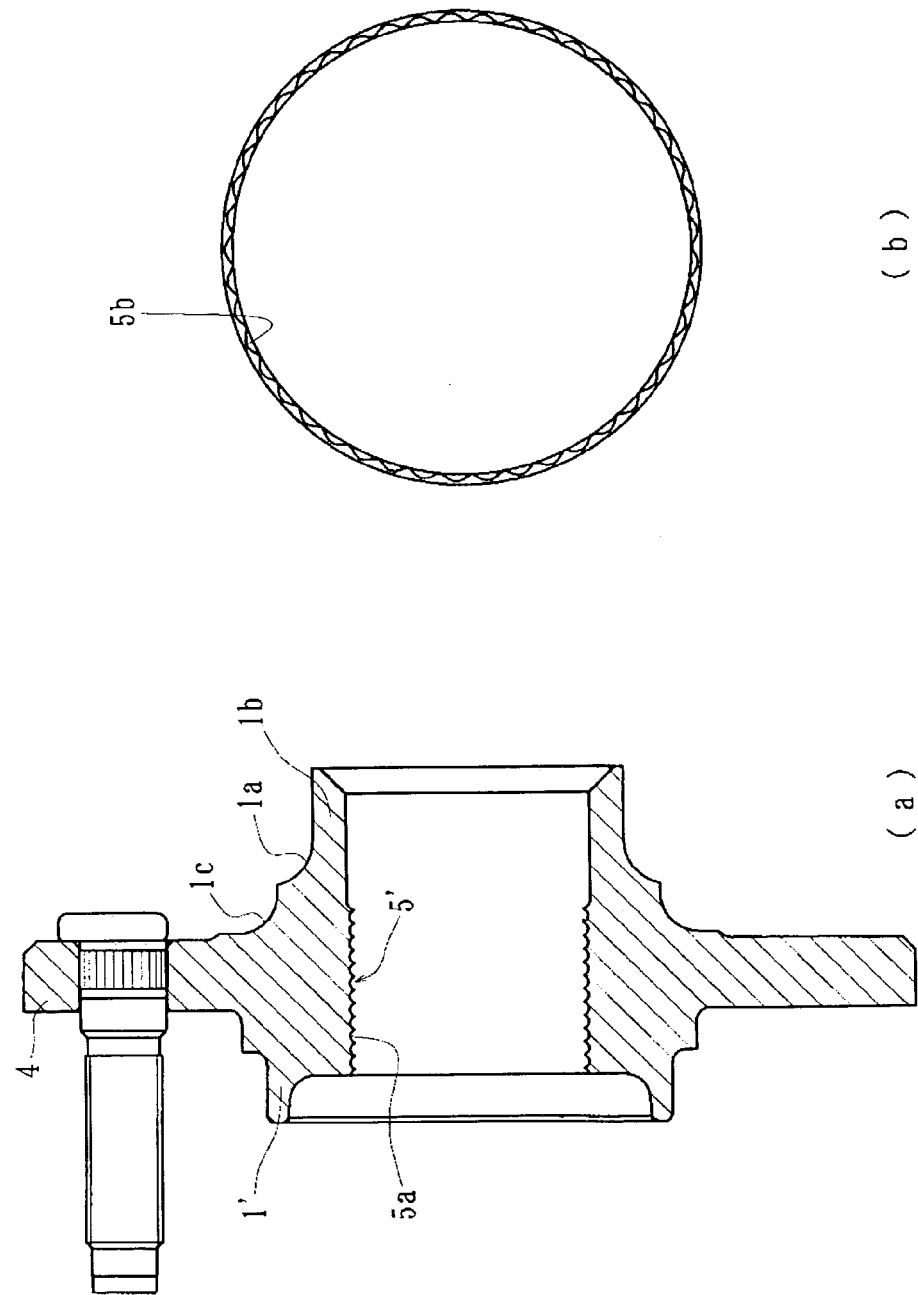
FIG. 11 (a) is a longitudinal section view showing another embodiment of the irregular portion and FIG. 11 (b) is an enlarged cross section view showing axial grooves of FIG. 11 (a)
Figure 12:
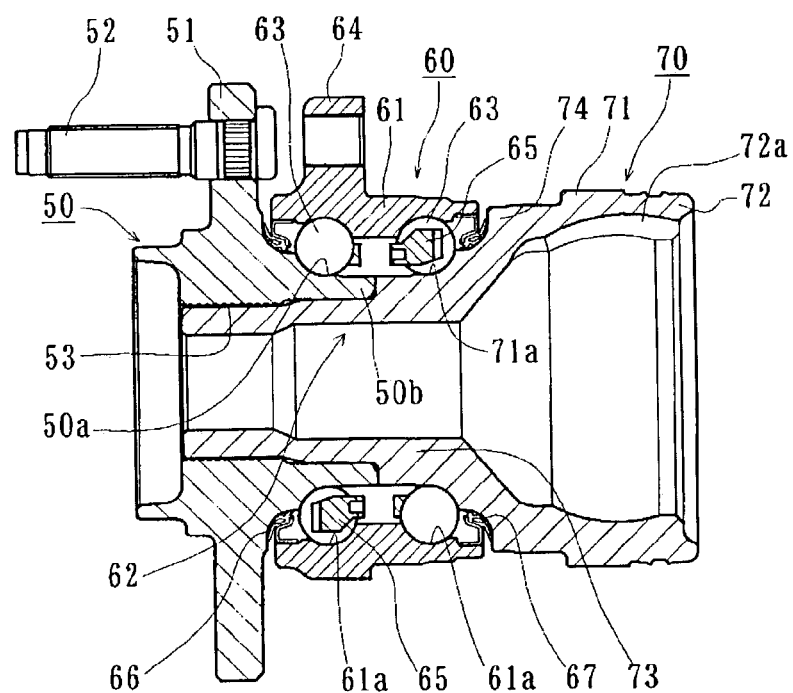
FIG. 12 is a longitudinal section view showing a bearing apparatus for a driving wheel of the prior art.

FIG. 11 is a longitudinal view showing another embodiment of the configuration of the irregular portion of the hub wheel of the present invention. The same reference numerals are also used in this drawing for designating same parts used in the first embodiment in FIG. 1.

Similarly to the embodiment previously described, in order to form an irregular portion 5' of a crisscross knurl pattern, a plurality of parallel annular grooves 5*a* are firstly formed on the inner circumferential surface of a hub wheel 1' for example by turning as shown in FIG. 11 (*a*). Then a plurality of axially extending parallel grooves 5*b* are formed orthogonally crossing the annular grooves 5*a* by broaching as shown in FIG. 11 (*b*). Of course, it is possible to form the axial grooves 5*b* prior to the formation of the annular grooves 5*a*.

If denoting the inner diameter of the spigot portion 1*b* formed at the end of the hub wheel 1' as "D1", the diameter of an inscribed circle of the annular grooves 5*a* as "D2", the diameter of the bottom of the annular grooves as "D4", and the diameter of the bottom of the axial grooves 5*b* as "D3", it is possible to prevent generation of scratches caused by teeth of broach during broaching of the inner diameter "D1" by setting a relation of D1>D3. Although the dimensional relation of "D1" and "D2" is set as D1>D2 and the dimensional relation of "D4" and "D1" is set as D4=D1 in the present embodiments, either one of "D4" and "D1" may be larger than the other one.

Although it is illustrated to form the irregular portion 5' of a crisscross knurl pattern formed by the annular grooves 5*a* and the axial grooves 5*b*, the annular grooves 5*a* may be replaced by one helical groove which can be easily formed by turning. Also it is possible to form the irregular portion of the crisscross knurl pattern firstly by forming a first helical grooves by a plurality of broaching and then by forming a second helical grooves by a second helical broaching of axial symmetry with the first broaching.

The present invention has been described with reference to the preferred embodiments of so-called "fourth generation" structure in which one of the inner raceway surfaces of the double row rolling bearing is formed on the hub wheel and the other is formed on the outer joint member. Obviously, modifications and alternations will occur to those of ordinary skill in the art upon reading and understanding the preceding detailed description. For example, a so-called "third generation" structure in which one of the inner raceway surfaces of the double row rolling bearing is formed on the hub wheel and the other is formed on the separate inner ring which is press fitted on the stepped portion of small diameter of the hub wheel. It is intended that the present invention be construed as including all such alternations and modifications insofar as they come within the scope of the appended claims or the equivalents thereof.

What is claimed is:

1. A bearing apparatus for a driving wheel of vehicle comprising:

a wheel hub formed with a wheel mounting flange at one end;

a constant velocity universal joint including an outer joint member integrally formed with a mouth portion, a shoulder portion formed on the bottom of the mouth portion and a shaft portion axially extending from the shoulder portion;

a double row rolling bearing for rotatably supporting a vehicle wheel relative to a body of a vehicle;

said wheel hub, constant velocity universal joint and double row rolling bearing being assembled as a unit, a first and second inner raceway surface, said wheel hub and outer joint member being fitted with each other with one end surface of the wheel hub being abutted against the shoulder of the outer joint member and a portion of the outer joint member shaft extending into an inner circumferential bore of said wheel hub, an inner circumferential surface at a fitting portion of the wheel hub being formed with a hardened irregular portion, the wheel hub and the outer joint member being integrally connected via plastic deformation of the outer joint member, such that the hardened irregular portion bites into the outer circumferential surface of the outer joint member at a fitting portion by radially outwardly expanding the fitting portion of the outer joint member;

and an outer circumferential surface of the outer joint member formed with a hardened layer, said hardened layer being at least in a region including the second inner raceway surface and a portion of the shaft portion except for the fitting portion of the outer joint member.

2. A bearing apparatus of claim 1, wherein the wheel hub is formed with a cylindrical spigot portion axially extending from the first inner raceway surface, and a hardened layer formed on the outer circumferential surface of the wheel hub in a region including the spigot portion and extending from the first inner raceway surface to one end surface of the wheel hub.

3. A bearing apparatus of claim 2, wherein a hardened layer is formed in a region of the wheel hub extending from the end surface of the wheel hub to the inner circumferential surface of the end of the spigot portion.

4. A bearing apparatus of claim 2, wherein the radial clearance between the spigot portion of the wheel hub and the shaft portion of the outer joint member is set less than 0.5 mm.

5. A bearing apparatus of claim 1, wherein a grease well is formed on the end surface of the wheel hub.

6. A bearing apparatus of claim 1, wherein grease is arranged between the abutted surfaces of the end of the wheel hub and the shoulder of the outer joint member.

7. A bearing apparatus for a driving wheel of vehicle comprising:

a wheel hub, constant velocity universal joint and double row rolling bearing being assembled as a unit, the wheel hub and an outer joint member of the constant velocity universal joint being fitted with each other, said outer joint member including an elongated spigot portion with a fitting portion at its end and a cylindrical pressure receiving surface extending from said fitting portion, an inner circumferential surface at the fitting portion of the wheel hub being formed with a hardened irregular portion, the wheel hub and the outer joint member fitting portion being integrally connected via plastic deformation of the outer joint member, the hardened irregular portion biting into the outer circumferential surface at the fitting portion of the outer joint member by radially outwardly expanding the fitting portion of the outer joint member;

bearings of said double row rolling bearing define a line of action which line intersects said outer joint member cylindrical pressure receiving support surface at a substantial distance from said outer joint member fitting portion such that bending moments occurring in said joint are supported on said cylindrical pressure receiving support surface, and said fitting portion being arranged axially outward from the line of action of the double row rolling bearing.

8. A bearing apparatus of claim 7, wherein the wheel hub and the outer joint member are mutually spigot-fitted, and the spigot-fitted portion being arranged on the line of action of the double row rolling bearing.

9. A bearing apparatus of claim 7, wherein the wheel hub is extended outward from the wheel mounting flange to form a wheel piloting portion, and the connected portion, via plastic deformation, being arranged at a region from the end face of the wheel piloting portion to the wheel mounting flange.

10. A bearing apparatus of claim 7, wherein a first inner raceway surface of the double row rolling bearing being formed on the outer circumferential surface of the wheel hub and a second inner raceway surface being formed on the outer circumferential surface of the outer joint member.

11. A bearing apparatus for a driving wheel of vehicle comprising:

a wheel hub, constant velocity universal joint and double row rolling bearing being assembled as a unit, the wheel hub being formed with a first inner raceway surface of the double row rolling bearing and a small diameter stepped portion, the wheel hub and an outer joint member of the constant velocity universal joint being fitted with each other, an inner circumferential surface at the fitting portion of the wheel hub being formed with a hardened irregular portion, the wheel hub and the outer joint member being integrally connected via plastic deformation of the outer joint member, such that said hardened irregular portion biting into the outer circumferential surface at the fitting portion of the outer joint member by radially outwardly expanding a fitting portion of the outer joint member, said irregular portion being formed by crossed grooves comprising one group of a plurality of parallel rows of grooves in one direction and another group of a plurality of parallel rows of grooves in a second direction, at least one group of grooves being formed by broaching, and a diameter of these grooves being smaller than an inner diameter of the small diameter stepped portion.

12. A bearing apparatus of claim 11, wherein a second inner raceway surface of the double row rolling bearing being formed on the outer circumferential surface of the outer joint member.

13. A bearing apparatus of claim 11, wherein a hardened layer is formed in a region extending from the inner raceway surface to the end surface of the stepped portion of small diameter as well as the inner circumferential surface of the end thereof.

14. A bearing apparatus of claim 11, wherein the radial clearance between the stepped portion of small diameter of the hub wheel and the shaft portion of the outer joint member is set less than 0.5 mm.

15. A bearing apparatus of claim 11, wherein the irregular portion being formed by discontinuous annular grooves and axially extending grooves crossing orthogonally with the annular grooves.

16. A bearing apparatus of claim 11, wherein the irregular portion is formed by helical grooves and axially extending grooves crossing with the helical grooves.

17. A bearing apparatus of claim 11, wherein the irregular portion is formed by a first group of inclined helical grooves and a second group of helical grooves axial symmetric with the first group of helical grooves.

* * * * *

UNITED STATES PATENT AND TRADEMARK OFFICE
CERTIFICATE OF CORRECTION

PATENT NO. : 7,267,490 B2  
APPLICATION NO. : 10/327549  
DATED : September 11, 2007  
INVENTOR(S) : Ozawa et al.

Page 1 of 1

It is certified that error appears in the above-identified patent and that said Letters Patent is hereby corrected as shown below:

Column 12
line 53, "46a" and 46b'"" should be --46a' and 46b'--
line 55, "46b'"" should be --46b'--
line 56, "46a'"" should be --46a'--
line 57, "46b'"" should be --46b'--
line 59, "46b'"" should be --46b'--

Signed and Sealed this

Twenty-fifth Day of December, 2007

JON W. DUDAS  
*Director of the United States Patent and Trademark Office*